US012558940B2

(12) United States Patent　　　(10) Patent No.: US 12,558,940 B2
Lin et al.　　　　　　　　　　　　　(45) Date of Patent: Feb. 24, 2026

(54) MULTI-CHANNEL COOLING PIPELINE INTEGRATION APPARATUS, THERMAL MANAGEMENT INTEGRATION MODULE AND ELECTRIC VEHICLE

(71) Applicants:Zhejiang Geely Holding Group Co., Ltd, Zhejiang (CN); Ningbo Geely Automobile Research & Development Co., Ltd., Zhejiang (CN)

(72) Inventors: Bingrong Lin, Zhejiang (CN); Junbo Xu, Zhejiang (CN); Guibin Li, Zhejiang (CN); Qiang Xue, Zhejiang (CN)

(73) Assignees: ZHEJIANG GEELY HOLDING GROUP CO., LTD, Zhejiang (CN); NINGBO GEELY AUTOMOBILE RESEARCH & DEVELOPMENT CO., LTD., Zhejiang (CN)

( * ) Notice: Subject to any disclaimer, the term of this patent is extended or adjusted under 35 U.S.C. 154(b) by 242 days.

(21) Appl. No.: 18/463,323

(22) Filed: Sep. 8, 2023

(65) Prior Publication Data

US 2023/0415544 A1　　Dec. 28, 2023

Related U.S. Application Data

(63) Continuation of application No. PCT/CN2021/102124, filed on Jun. 24, 2021.

(51) Int. Cl.
*B60H 1/00*　　　(2006.01)
*B60L 53/302*　　(2019.01)
*B60L 58/26*　　　(2019.01)

(52) U.S. Cl.
CPC ........ *B60H 1/00899* (2013.01); *B60L 53/302* (2019.02); *B60L 58/26* (2019.02); *B60L 2210/10* (2013.01)

(58) Field of Classification Search
CPC ........... B60H 1/00899; B60H 1/00485; B60H 1/3229; B60H 1/00278; B60H 1/00571;
(Continued)

(56) References Cited

U.S. PATENT DOCUMENTS 4,430,966 A　2/1984　Marandet et al.
5,377,528 A　1/1995　Dauvergne
(Continued)

FOREIGN PATENT DOCUMENTS

CN　　205112967 U　　3/2016
CN　　106103153 A　　11/2016
(Continued)

OTHER PUBLICATIONS

International Search Report dated Mar. 22, 2022 in International Application No. PCT/CN2021/102124. English translation attached.
(Continued)

*Primary Examiner* — Kun Kai Ma

(57) ABSTRACT

A multi-channel cooling pipeline integration apparatus, a thermal management integration module, and an electric vehicle are provided, which belong to the field of vehicle technologies. The multi-channel cooling pipeline integration apparatus is in a substantially rectangular plate shape, and has a plurality of cooling connection pipelines formed therein. A plurality of component mounting points and a plurality of component connection ports are disposed on a surface of the multi-channel cooling pipeline integration apparatus. The plurality of component mounting points is configured to have at least two thermal management components mounted thereon. Each of the plurality of component connection ports is in communication with a corresponding one of the plurality of cooling connection pipelines, to enable the at least two thermal management components to be connected to the plurality of cooling (Continued)

110 connection pipelines. The at least two thermal management components are configured to be connected to each other.

19 Claims, 6 Drawing Sheets

(58) Field of Classification Search
CPC ....... B60H 1/143; B60L 53/302; B60L 58/26; B60L 2210/10; B60K 11/02; B60Y 2200/91; F01P 11/04
See application file for complete search history.

(56) References Cited

U.S. PATENT DOCUMENTS

| | | | |
|---|---|---|---|
| 2019/0039440 A1* | 2/2019 | Calderone ............ | B60K 7/0007 |
| 2020/0353811 A1 | 11/2020 | Wolf et al. | |
| 2021/0053415 A1 | 2/2021 | Oh et al. | |

FOREIGN PATENT DOCUMENTS

| | | |
|---|---|---|
| CN | 107415717 A | 12/2017 |
| CN | 111231613 A | 6/2020 |
| CN | 112319210 A | 2/2021 |
| CN | 112389155 A | 2/2021 |
| CN | 112477549 A | 3/2021 |
| CN | 212765592 U | 3/2021 |
| CN | 112606676 A1 | 4/2021 |
| CN | 113212104 A | 8/2021 |
| CN | 113212105 A | 8/2021 |
| JP | 2018184075 A | 11/2018 |
| KR | 102189058 B1 | 12/2020 |
| WO | 2021048095 A1 | 3/2021 |

OTHER PUBLICATIONS

Extended European Search Report from corresponding European Application No. EP21946441.9, dated Apr. 5, 2024.
First Office Action dated Sep. 3, 2024 received in corresponding patent family application No. JP2023-576239. English translation attached.
First Office Action dated Jul. 30, 2025 received in corresponding patent family application No. CN202180090191.3. English translation attached.
Intention to grant dated Aug. 8, 2025 received in corresponding patent family application No. EP21946441.9.
Decision to Grant dated Jun. 10, 2025 received in corresponding patent family application No. JP2023576239. English translation attached.
First Office Action dated May 30, 2025 received in corresponding patent family application No. KR1020237035573. English translation attached.
Grant Notice dated Oct. 13, 2025 received in corresponding patent family application No. CN202180090191.3. English translation attached.

* cited by examiner

MULTI-CHANNEL COOLING PIPELINE INTEGRATION APPARATUS, THERMAL MANAGEMENT INTEGRATION MODULE AND ELECTRIC VEHICLE

CROSS-REFERENCE TO RELATED APPLICATIONS

This application is a continuation of International Application No. PCT/CN2021/102124 filed on Jun. 24, 2021, the entire disclosure of which is incorporated herein by reference.

FIELD

The present disclosure relates to the field of vehicle technologies, and more particularly, to a multi-channel cooling pipeline integration apparatus, a thermal management integration module and an electric vehicle.

BACKGROUND

Based on a vehicle thermal management principle diagram, an electric vehicle often requires a number of thermal management components, such as an expansion tank, at least two cooling water pumps, a heat exchanger, a water-cooled condenser, at least two water temperature sensors, a four-port solenoid valve, a three-port solenoid valve, and a cooling connection pipeline. To increase a range of a pure electric vehicle, the design of the vehicle thermal management diagram needs to be adapted to more and more working conditions, and thus more and more thermal management components are required. In the related art, these thermal management components are dispersed, which not only occupy a large arrangement space, but also require a large number of cooling Ethylene Propylene Diene Monomer (EPDM) rubber hoses or PA12 nylon tubes for connections between the thermal management components, leading to an increase in system costs and weight. Therefore, there is an urgent need for an integrated multi-channel cooling connection pipeline that can save costs and an arrangement space and achieve a lightweight design.

SUMMARY

In view of the above problems, a multi-channel cooling pipeline integration apparatus, a thermal management integration module, and an electric vehicle that overcome the above problems or at least partially solve the above problems are provided.

An object of a first aspect of the present disclosure is to provide a multi-channel cooling pipeline integration apparatus, which can serve as a connection channel and a carrier member for thermal management components to avoid use of a large number of cooling rubber hoses or nylon tubes, thereby saving costs and an arrangement space of a thermal management system and achieving a lightweight design of a whole vehicle.

A further object of the first aspect of the present disclosure is to realize a more compact arrangement of the integrated thermal management components through a reasonable layout of component mounting points on the multi-channel cooling pipeline integration apparatus, and to optimize a layout of cooling connection pipelines in the multi-channel cooling pipeline integration apparatus, reducing manufacturing difficulty.

A further object of the first aspect of the present disclosure is to make a connection pipeline between a thermal management object and a cooling pipeline external port of the multi-channel cooling pipeline integration apparatus to be the shortest, to further reduce costs and a weight of the whole vehicle.

A further object of a second aspect of the present disclosure is to provide a thermal management integrated module that employs the above-mentioned multi-channel cooling pipeline integration apparatus to achieve low costs, light weight, and small arrangement space.

A further object of a third aspect of the present disclosure is to provide an electric vehicle that employs the above-mentioned thermal management integration module to reduce the costs and weight of the whole vehicle.

In particular, according to an embodiment of the present disclosure, a multi-channel cooling pipeline integration apparatus is provided. The multi-channel cooling pipeline integration apparatus is in a substantially rectangular plate shape, and has a plurality of cooling connection pipelines formed therein. A plurality of component mounting points and a plurality of component connection ports are disposed on a surface of the multi-channel cooling pipeline integration apparatus. The plurality of component mounting points is configured to have at least two thermal management components mounted thereon. Each of the plurality of component connection ports is in communication with a corresponding one of the plurality of cooling connection pipelines, to enable the at least two thermal management components mounted on the plurality of component mounting points to be connected, through the plurality of component connection ports, to the plurality of cooling connection pipelines. The at least two thermal management components are configured to be connected to each other through the plurality of cooling connection pipelines.

In some embodiments, the plurality of component mounting points includes at least two of an expansion tank mounting point, a multi-port valve mounting point, a water pump mounting point, a heat exchanger mounting point, a condenser mounting point, a temperature sensor mounting point, or a two-port proportional valve mounting point.

In some embodiments, when the plurality of component mounting points includes a plurality of water pump mounting point, the plurality of water pump mounting points is disposed on a side of an end of the multi-channel cooling pipeline integration apparatus in a length direction, and a position distribution of the plurality of water pump mounting points enables at least two water pumps to be mounted, via the plurality of water pump mounting points, on the same side of the end of the multi-channel cooling pipeline integration apparatus in the length direction and to be arranged in a width direction of the multi-channel cooling pipeline integration apparatus; and when the plurality of component mounting points further includes the expansion tank mounting point, the expansion tank mounting point is disposed on the other side of the end of the multi-channel cooling pipeline integration apparatus at which the water pump mounting point is located, to enable an expansion tank to be mounted at a position on a side of the multi-channel cooling pipeline integration apparatus opposite to the water pump.

In some embodiments, when the plurality of component mounting points further includes the multi-port valve mounting point, the multi-port valve mounting point is disposed on a middle portion of a side of the multi-channel cooling pipeline integration apparatus, to enable a multi-port valve to be mounted on the middle portion of the side of the multi-channel cooling pipeline integration apparatus.

In some embodiments, when the plurality of component mounting points further includes the heat exchanger mounting point, the heat exchanger mounting point is disposed on the same side of the multi-channel cooling pipeline integration apparatus as the multi-port valve mounting point, and a position distribution of the heat exchanger mounting point enables a heat exchanger to be mounted at a position on the same side of the multi-channel cooling pipeline integration apparatus as the multi-port valve and close to the multi-port valve.

In some embodiments, when the plurality of component mounting points further includes the condenser mounting point, the condenser mounting point is disposed at an end of the multi-channel cooling pipeline integration apparatus in a length direction, on the same side as the heat exchanger mounting point, and a position distribution of the condenser mounting point enables a condenser to be mounted at a position on the same side of the multi-channel cooling pipeline integration apparatus as the heat exchanger and adjacent to the heat exchanger.

In some embodiments, the multi-channel cooling pipeline integration apparatus has a plurality of cooling pipeline external ports, each of the plurality of cooling pipeline external ports is configured to be connected to a cooling liquid connection pipeline of a thermal management object of a vehicle, and positions of the plurality of cooling pipeline external ports are arranged based on an arrangement position of the thermal management object to enable the cooling liquid connection pipeline of the thermal management object to be the shortest.

In some embodiments, the plurality of cooling pipeline external ports includes a radiator liquid-inlet port, a radiator liquid-outlet port, a Direct Current-Direct Current (DC-DC) converter liquid-inlet port, a high pressure liquid heater liquid-inlet port, a high pressure liquid heater liquid-outlet port, an on-vehicle charger liquid-outlet port, a battery pack liquid-inlet port, and a battery pack liquid-outlet port; the radiator liquid-inlet port, the radiator liquid-outlet port, and the DC-DC converter liquid-inlet port are located at an end of the multi-channel cooling pipeline integration apparatus in a length direction, and the radiator liquid-inlet port and the radiator liquid-outlet port protrude towards a side of the multi-channel cooling pipeline integration apparatus; and the high pressure liquid heater liquid-inlet port, the on-vehicle charger liquid-outlet port, the battery pack liquid-outlet port, the high pressure liquid heater liquid-outlet port, and the battery pack liquid-inlet port are located at the other end of the multi-channel cooling pipeline integration apparatus in the length direction, are arranged in a width direction of the multi-channel cooling pipeline integration apparatus sequentially, and each have a protrusion direction identical to a protrusion direction of the radiator liquid-inlet port.

In some embodiments, a plurality of mounting lugs is further provided on the multi-channel cooling pipeline integration apparatus, each of the plurality of mounting lugs protrudes outwards from an edge of the multi-channel cooling pipeline integration apparatus, and a through hole is defined on each of the plurality of mounting lugs and is configured to cooperate with a fastener, to mount the multi-channel cooling pipeline integration apparatus to a body of a vehicle.

In some embodiments, three mounting lugs are provided, and are disposed on three edges of a substantially rectangular contour of the multi-channel cooling pipeline integration apparatus, respectively.

In some embodiments, the multi-channel cooling pipeline integration apparatus includes a main body portion, a first cover plate portion, and a second cover plate portion; the main body portion, the first cover plate portion, and the second cover plate portion are assembled together sequentially in a thickness direction of the multi-channel cooling pipeline integration apparatus; a first group of cooling connection pipelines are provided on the main body portion and have an opening towards the first cover plate portion; the first cover plate portion seals the first group of cooling connection pipelines, and a second group of cooling connection pipelines are provided on the first cover plate portion and have an opening towards the second cover plate portion; and the second cover plate portion seals the second group of cooling connection pipelines.

In some embodiments, the multi-channel cooling pipeline integration apparatus is made of a thermal insulating plastic.

In some embodiments, the thermal insulating plastic includes polypropylene or polyamide 66.

In some embodiments, the main body portion, the first cover plate portion, and the second cover plate portion each are formed by means of injection molding.

In some embodiments, the main body portion, the first cover plate portion, and the second cover plate portion are assembled by means of hot plate welding, friction welding, or laser welding.

In some embodiments, an expansion tank body is fixedly integrated on the multi-channel cooling pipeline integration apparatus, the expansion tank body is composed of a tank body and a tank side cover, the tank body and the second cover plate portion are integrally formed, the tank side cover is formed by means of injection molding, and the tank body and the tank side cover are assembled by means of hot plate welding, friction welding, or laser welding.

According to an embodiment of the present disclosure, a thermal management integration module is further provided. The thermal management integration module includes: the multi-channel cooling pipeline integration apparatus according to any of the above-mentioned embodiments; and at least two thermal management components mounted on the multi-channel cooling pipeline integration apparatus and connected to each other through the cooling connection pipeline.

In some embodiments, the at least two thermal management components include at least two of an expansion tank, a multi-port valve, a water pump, a heat exchanger, a condenser, a temperature sensor, a dryer, an electronic expansion valve, a two-port proportional valve, or an air conditioning pipeline.

According to an embodiment of the present disclosure, an electric vehicle is further provided. The electric vehicle includes the thermal management integration module according to any one of the above-mentioned embodiments.

The multi-channel cooling pipeline integration apparatus of the present disclosure has the plurality of cooling connection pipelines formed therein. The plurality of component mounting points and the plurality of component connection ports are disposed on the surface of the multi-channel cooling pipeline integration apparatus, to enable the multi-channel cooling pipeline integration apparatus not only to serve as the connection channel between different thermal management components, but also to serve as the carrier member for the thermal management components. In this way, the thermal management components may be integrated on the multi-channel cooling pipeline integration apparatus without using a large number of cooling rubber hoses or nylon tubes, thereby saving the costs and arrangement space of the thermal management system and achieving the lightweight design of the whole vehicle.

Further, with respect to the to-be-integrated thermal management components, the reasonable layout of component mounting points, corresponding to the to-be-integrated thermal management components, (which may include the expansion tank mounting point, the multi-port valve mounting point, the water pump mounting point, the heat exchanger mounting point, the condenser mounting point, the temperature sensor mounting point, the two-port proportional valve mounting point, and so on) on the multi-channel cooling pipeline integration apparatus can realize the more compact arrangement of the integrated thermal management components, and the layout of cooling connection pipelines in the multi-channel cooling pipeline integration apparatus can be optimized, reducing the manufacturing difficulty.

Further, the multi-channel cooling pipeline integration apparatus may further provide a plurality of cooling pipeline external ports that are configured to be connected to a connection pipeline of the thermal management object. In addition, positions of the cooling pipeline external ports are arranged based on the arrangement position of the thermal management object to enable the connection pipeline of the thermal management object to be the shortest, further reducing the costs and weight of the whole vehicle.

Further, since the multi-channel cooling pipeline integration apparatus of the present disclosure can save a large number of cooling connection pipelines, a flow resistance and a heat leakage value of the system are reduced, which can lower a power requirement of the water pump, and reduce PTC heating time or PTC heating power, further decreasing the costs and power consumption of the whole vehicle and increasing a range. It was estimated that a power requirement of the water pump can be reduced by about 20%, and PTC heating power consumption can be reduced by about 200 W, and the range can be increased by about km.

The above description is merely an overview of the technical solutions of the present disclosure. To facilitate a clear understanding of technical means of the present disclosure and the implementations of the technical solutions in accordance with the contents of the specification, and to clarify and explain the above and other objects, features, and advantages of the present disclosure, specific embodiments of the present disclosure will be described below.

The above and other objects, advantages, and features of the present disclosure will be clearly understood by those skilled in the art in the light of the following detailed description of specific embodiments of the present disclosure made in conjunction with the accompanying drawings.

BRIEF DESCRIPTION OF THE DRAWINGS

Some specific embodiments of the present disclosure will be described in detail below in an exemplary and non-restrictive manner with reference to the accompanying drawings. Same or similar components or portions are denoted by same reference numerals in the accompanying drawings. It should be understood by those skilled in the art that these accompanying drawings are not necessarily drawn to scale.

DETAILED DESCRIPTION

Figure 1:
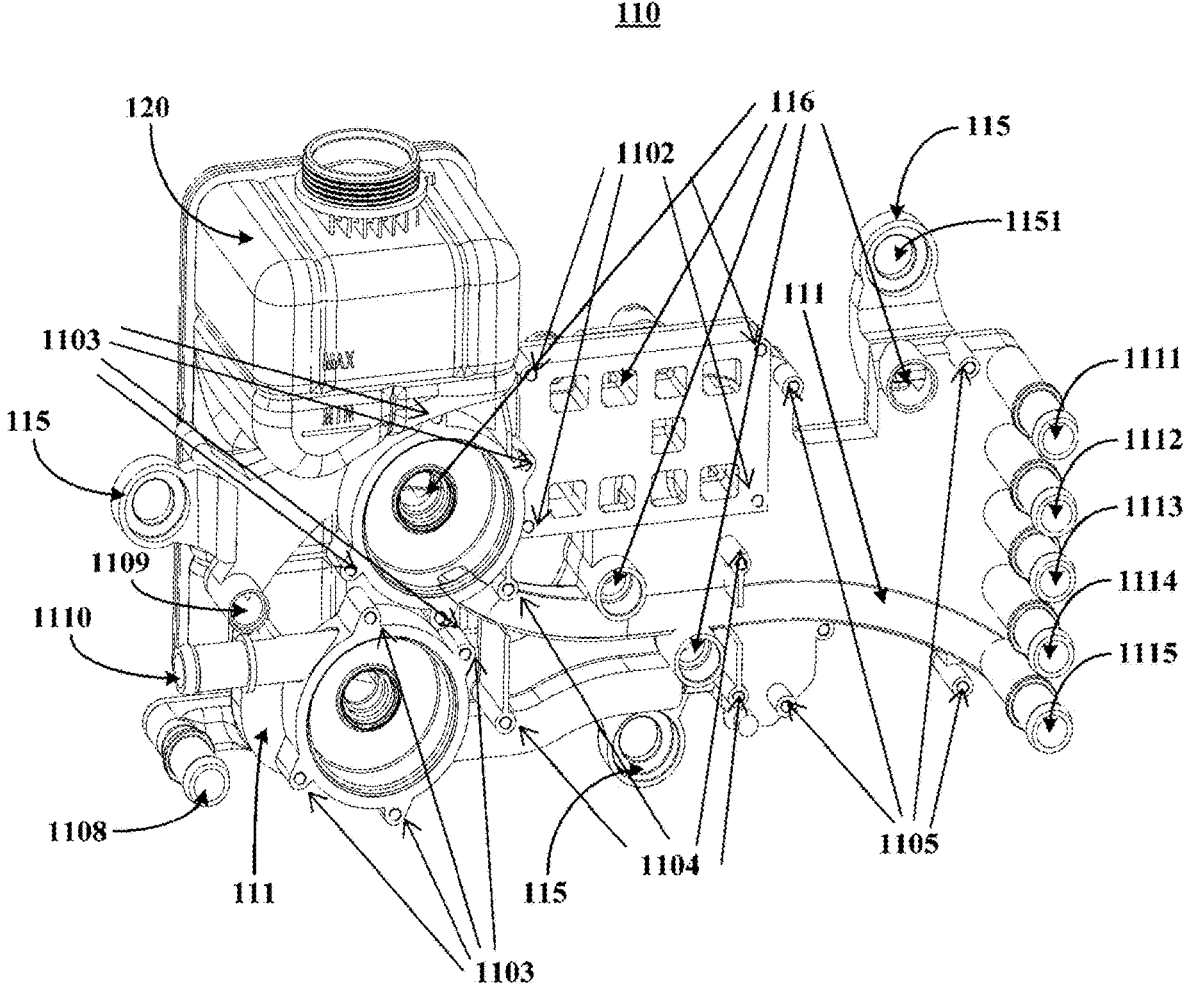
FIG. 1 illustrates a schematic structural view of a multi-channel cooling pipeline integration apparatus according to an embodiment of the present disclosure, as viewed from a side thereof.

Some exemplary embodiments of the present disclosure will be described in detail below with reference to the accompanying drawings. Although some exemplary embodiments of the present disclosure are illustrated in the drawings, it should be understood that the present disclosure may be embodied in various forms and should not be construed as being limited to the embodiments set forth herein. Instead, these embodiments are provided for a thorough understanding of the present disclosure, and these embodiments can fully convey the scope of the present disclosure to those skilled in the art.

Since thermal management components in a conventional vehicle thermal management system are arranged in a dispersed manner, the conventional vehicle thermal management system has the following problems: (1) Lengths of a cooling pipeline and an air conditioning pipeline increase, which leads to a rise in a flow resistance of the system, requiring the use of a high-power pump to meet a system requirement. (2) Increase in the lengths of the cooling pipeline and the air conditioning pipeline further leads to an increase in a heat leakage value of the system, raising a need to lengthen PTC heating time or increase PTC heating power to meet a heating requirement of the system. (3) Thermal management components such as an expansion tank, a motor water pump assembly, a battery water pump assembly, a heat exchanger, a water-cooled condenser, a water temperature sensor, a four-port solenoid valve, a three-port solenoid valve, a two-port proportional valve, an air conditioning electronic expansion valve, and an air conditioning pipeline are arranged in a dispersed manner, and connected by the cooling pipeline and the air conditioning pipeline, resulting in a complex space requirement for an arrangement. (4) The above-mentioned thermal management components are supplied by different suppliers and assembled at the base, which make the working hours longer and are not conducive to supplier management. (5) A large number of cooling pipelines and air conditioning pipelines need to be used, leading to an increase in costs and a weight of the whole vehicle. Therefore, there is an urgent need for an integrated multi-channel cooling connection pipeline that can be used for an integrated arrangement of the thermal management components in terms of cost saving, light weight, arrangement space, or the like.

Figure 2:
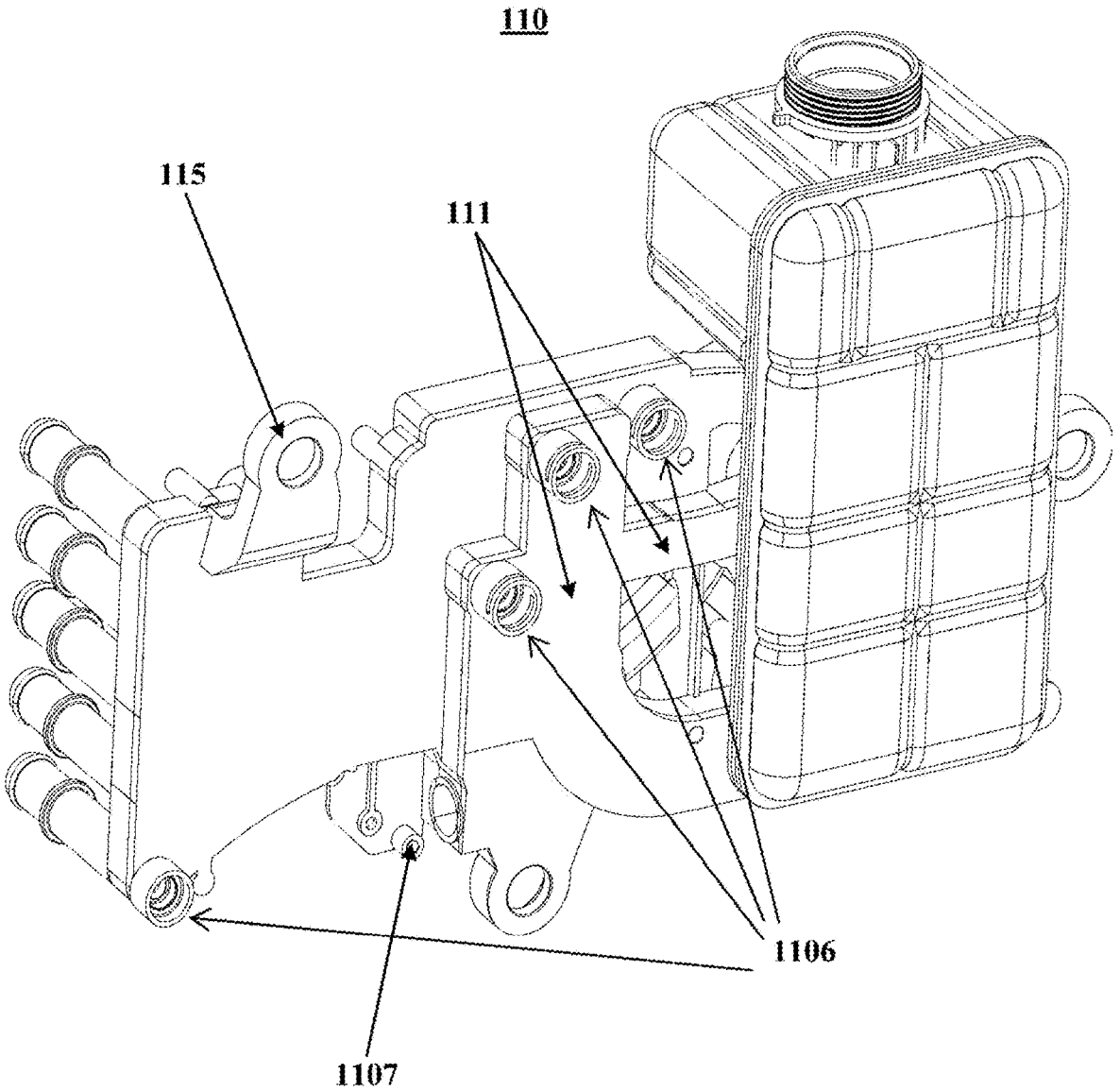
FIG. 2 illustrates a schematic structural view of the multi-channel cooling pipeline integration apparatus illustrated in FIG. 1, as viewed from another side thereof.

To solve or at least partially solve the above technical problems, the embodiments of the present disclosure provide a multi-channel cooling pipeline integration apparatus. FIG. 1 illustrates a schematic structural view of a multi-channel cooling pipeline integration apparatus 110 according to an embodiment of the present disclosure, as viewed from a side thereof. FIG. 2 illustrates a schematic structural view of the multi-channel cooling pipeline integration apparatus 110 illustrated in FIG. 1, as viewed from another side thereof. As illustrated in FIG. 1 and FIG. 2, the multi-channel cooling pipeline integration apparatus 110 is in a substantially rectangular plate shape, and has a plurality of cooling connection pipelines 111 formed therein. A plurality of component mounting points and a plurality of component connection ports 116 are disposed on a surface of the multi-channel cooling pipeline integration apparatus 110. The plurality of component mounting points is configured to have at least two thermal management components mounted thereon. Each of the plurality of component connection ports 116 is in communication with a corresponding one of the plurality of cooling connection pipelines 111, to enable the at least two thermal management components mounted on the plurality of component mounting points to be connected, through the plurality of component connection ports 116, to the corresponding cooling connection pipelines 111. The at least two thermal management components are configured to be connected to each other through the plurality of cooling connection pipelines 111.

The multi-channel cooling pipeline integration apparatus 110 according to the embodiments of the present disclosure has the plurality of cooling connection pipelines 111 formed therein. The plurality of component mounting points and the plurality of component connection ports 116 are disposed on the surface of the multi-channel cooling pipeline integration apparatus 110, to enable the multi-channel cooling pipeline integration apparatus 110 not only to serve as a connection channel between different thermal management components, but also to serve as a carrier member for the thermal management components. In this way, the thermal management components may be integrated on the multi-channel cooling pipeline integration apparatus 110 without using a large number of cooling rubber hoses or nylon tubes, thereby saving costs and an arrangement space of a thermal management system and achieving a lightweight design of a whole vehicle.

In an application, the cooling connection pipeline 111 inside the multi-channel cooling pipeline integration apparatus 110 is designed based on a connection method for respective thermal management components in a actually-used vehicle thermal management principle diagram, to realize a pipeline (e.g., water line) connection between the thermal management components. Generally speaking, each cooling connection pipeline 111 inside the multi-channel cooling pipeline integration apparatus 110 extends substantially along a length direction of the multi-channel cooling pipeline integration apparatus 110. In use, the multi-channel cooling pipeline integration apparatus 110 is mounted in a manner that the length direction of the multi-channel cooling pipeline integration apparatus 110 is substantially parallel to a horizontal direction and a width direction of the multi-channel cooling pipeline integration apparatus 110 is substantially perpendicular to a vehicle chassis, minimizing a flow resistance of a cooling liquid (e.g., water), flowing through each cooling connection pipeline 111, generated due to gravity.

The component mounting points on the multi-channel cooling pipeline integration apparatus 110 may be selected based on thermal management components that are actually required for thermal management of the whole vehicle. Also, positions of the component mounting points may be arranged based on shapes and sizes of the thermal management components that are actually required, connection and operation methods of the thermal management components in the vehicle thermal management principle diagram, or the like, to enable these thermal management components to be integrally arranged on the multi-channel cooling pipeline integration apparatus 110 in a spatially reasonable manner. The component connection ports 116 may be disposed correspondingly based on the component mounting points, to enable the thermal management components integrally arranged, via these component mounting points, on the multi-channel cooling pipeline integration apparatus 110 to be connected, by means of these component connection ports 116, to each other through the cooling connection pipelines 111 within the multi-channel cooling pipeline integration apparatus 110.

Generally, the component mounting points on the multi-channel cooling pipeline integration apparatus 110 may include at least two of an expansion tank mounting point, a multi-port valve mounting point 1102, a water pump mounting point 1103, a heat exchanger mounting point 1104, a condenser mounting point 1105, a temperature sensor mounting point 1106, a two-port proportional valve mounting point 1107, or the like, to correspondingly integrate at least two of an expansion tank, a multi-port valve 130, a water pump 140, a heat exchanger 150, a condenser 160 (e.g., a water-cooled condenser), a temperature sensor 170, a two-port proportional valve 192, or the like, to the multi-channel cooling pipeline integration apparatus 110.

In some embodiments, the component mounting points include the water pump mounting point 1103. In this case, a plurality of water pump mounting points 1103 is disposed on a side of an end of the multi-channel cooling pipeline integration apparatus 110 in a length direction, and a position distribution of the plurality of water pump mounting points 1103 enables at least two water pumps 140 to be mounted, via the plurality of water pump mounting points 1103, on the same side of the end of the multi-channel cooling pipeline integration apparatus 110 in the length direction and to be arranged in a width direction of the multi-channel cooling pipeline integration apparatus 110. Such an arrangement of the plurality of water pump mounting points 1103 facilitates mounting and management of the water pumps 140, and allows for more efficient use of a mounting space on the multi-channel cooling pipeline integration apparatus 110. In an embodiment, with respect to a water pump having a cylindrical pump casing, as illustrated in FIG. 1, the water pump mounting points 1103 of the water pump are a plurality of first fixation blocks uniformly distributed on and circumferentially protruding from an outer periphery of a circular ring-shaped first fixation member on the multi-channel cooling pipeline integrating apparatus 110. Each first fixation block has a first through hole formed therein. A second fixation member corresponding to the first fixation member may be disposed at an end of the pump casing of the water pump. A second fixation block corresponding to the first fixation block is disposed at an outer periphery of the second fixation member. A second through hole corresponding to the first through hole is formed in each second fixation block. In mounting, a fastener (e.g., a bolt) is used to pass through a second through hole and a corresponding first through hole to fixedly mount the water pump 140 to the multi-channel cooling pipeline integration apparatus 110. The component connection port 116 corresponding to the water pump 140 is disposed at a center of a corresponding first fixation member to connect the water pump 140 to the cooling connection pipeline 111. In an embodiment, the water pump mounting point 1103 may include a motor water pump mounting point 1103 configured to have a motor water pump mounted thereon and a battery water pump mounting point 1103 configured to have a battery water pump mounted thereon. The motor water pump mounting point 1103 is located below the battery water pump mounting point 1103 (herein, the expression "below" should be interpreted with respect to a use state of the multi-channel cooling pipeline integration apparatus 110). The motor water pump refers to a water pump configured to drive the cooling liquid in a motor cooling loop of the vehicle to flow. The battery water pump refers to a water pump configured to drive the cooling liquid in a battery pack cooling loop of the vehicle to flow.

In some embodiments, the component mounting points may further include the expansion tank mounting point. The expansion tank mounting point may be disposed on the other side of the end of the multi-channel cooling pipeline integration apparatus 110 at which the water pump mounting point 1103 is located, to enable an expansion tank to be mounted at a position on a side of the multi-channel cooling pipeline integration apparatus 110 opposite to the water pump 140. Since the expansion tank has a large volume and is usually connected to one of the water pumps 140, such an arrangement can minimize a length of the cooling connection pipeline 111 (connection channel) between the expansion tank and the water pump 140 to the maximum extent to reduce the flow resistance, and allow the mounting space on the multi-channel cooling pipeline integration apparatus 110 to be more effectively utilized, thereby saving the arrangement space. In other embodiments, taking into consideration that the expansion tank has a relatively large volume, it is difficult to ensure stability of the expansion tank by using the mounting points for mounting. In addition, a material of the expansion tank is similar to a material of the cooling connection pipeline 111. Therefore, the expansion tank and the multi-channel cooling pipeline integration apparatus 110 may be integrally formed, which will be described in detail later on. It should be noted that, while the position of the expansion tank mounting point is not illustrated in the accompanying drawings, those skilled in the art should be able to provide an appropriate expansion tank mounting point on the multi-channel cooling pipeline integration apparatus 110 after reading the present disclosure, to enable the expansion tank to be mounted at the position on the side of the multi-channel cooling pipeline integration apparatus 110 opposite to the water pumps 140.

In some embodiments, the component mounting points may further include the multi-port valve mounting point 1102. According to the vehicle thermal management principle diagram, ports of the multi-port valve are connected to the plurality of thermal management components in the vehicle thermal management system, to control on-off of different thermal management loops. Therefore, the multi-port valve mounting point 1102 may be disposed on a middle portion of a side of the multi-channel cooling pipeline integration apparatus 110, to enable the multi-port valve 130 to be mounted on the middle portion of the side of the multi-channel cooling pipeline integration apparatus 110, which facilitates the connection of the multi-port valve 130 to other thermal management components. The multi-port valve 130 may be a four-port solenoid valve, a three-port solenoid valve, etc. In some embodiments, the multi-port valve 130 is a nine-port valve, which can replace one conventional three-port solenoid valve and two conventional four-port solenoid valves in the vehicle thermal management system to realize nine channels, further reducing the costs and weight of the whole vehicle. In some embodiments, the multi-port valve 130 may be a one-piece nine-port valve. For the one-piece nine-port valve, the multi-channel cooling pipeline integration apparatus 110 has a plate-like mounting panel formed thereon. Nine channel interfaces (i.e., component connection ports 116 of the one-piece nine-port valve) configured to be connected to the nine channels of the one-piece nine-port valve are intensively disposed on the mounting panel to achieve uniformity of port positions. By using the component connection ports 116 that are intensively disposed on the plate-like mounting panel and the corresponding multi-port valve mounting points 1102, mounting of the one-piece nine-port valve can be facilitated, which can further reduce the arrangement space occupied by the multi-port valve 130 and greatly improves the arrangement space and aesthetics of distribution of the cooling connection pipelines 111 in communication with these ports.

In some embodiments, the component mounting points may further include the heat exchanger mounting point 1104. The heat exchanger mounting point 1104 is disposed on the same side of the multi-channel cooling pipeline integration apparatus 110 as the multi-port valve mounting point 1102, and a position distribution of the heat exchanger mounting point 1104 enables the heat exchanger 150 to be mounted at a position on the same side of the multi-channel cooling pipeline integration apparatus 110 as the multi-port valve 130 and close to the multi-port valve 130, thereby effectively shortening a length of a connection pipeline between the heat exchanger 150 and the port of the multi-port valve 130. In a specific embodiment, the multi-port valve mounting point 1102 may be mounted on an upper side of the middle portion of the multi-channel cooling pipeline integration apparatus 110 (the "upper side" herein refers to an upper side of the multi-channel cooling pipeline integration apparatus 110 in a vertical direction when the multi-channel cooling pipeline integration apparatus 110 is in use). The heat exchanger mounting point 1104 is mounted on a lower side of the middle portion, as illustrated in FIG. 1.

In some embodiments, the component mounting points may further include the condenser mounting point 1105. The condenser mounting point 1105 is disposed at an end of the multi-channel cooling pipeline integration apparatus 110 in a length direction, on the same side as the heat exchanger mounting point 1104, and a position distribution of the condenser mounting point 1105 enables the condenser 160 to be mounted at a position on the same side of the multi-channel cooling pipeline integration apparatus 110 as the heat exchanger 150 and adjacent to the heat exchanger 150. Since the condenser in the vehicle thermal management system usually has a large volume, disposing the condenser mounting point 1105 at the end of the multi-channel cooling pipeline integration apparatus 110 in the length direction enables the condenser 160 to be mounted at the end of the multi-channel cooling pipeline integration apparatus 110 in the length direction, to ensure that a sufficient arrangement space is provided for the condenser 160. In addition, the arrangement that the condenser 160 is located on the same side of the multi-channel cooling pipeline integration apparatus 110 as the heat exchanger 150 and adjacent to the heat exchanger 150 can improve utilization of the mounting space. It should be understood by those skilled in the art that, when the component mounting points include both the expansion tank mounting point and the condenser mounting point 1105, the expansion tank mounting point and the condenser mounting point 1105 are disposed at two ends of the multi-channel cooling pipeline integration apparatus 110 in the length direction, respectively, to enable the expansion tank 120 and the condenser 160 to be mounted on two ends of the multi-channel cooling pipeline integration apparatus 110 in the length direction, respectively, thereby ensuring a sufficient arrangement space for each of the expansion tank 120 and the condenser 160.

In some embodiments, the component mounting points may further include the temperature sensor mounting point 1106. The temperature sensor mounting point 1106 is disposed at a position corresponding to a designated cooling connection pipeline 111, to enable the temperature sensor 170 mounted on the temperature sensor mounting point 1106 to measure a temperature of the cooling liquid (e.g., water) in the designated cooling connection pipeline 111. A quantity and a position of the temperature sensor mounting point 1106 may be set based on an actually-required vehicle thermal management principle diagram. For example, four temperature sensor mounting points 1106 may be provided and configured to have four temperature sensors 170 mounted thereon, respectively.

In some embodiments, the component mounting points may further include the two-port proportional valve mounting point 1107. The two-port proportional valve mounting point 1107 is disposed at a position corresponding to the cooling connection pipeline 111 configured to connect one of the water pumps 140 to the condenser 160, to enable the two-port proportional valve 192 (e.g., an intelligent two-port proportional valve) mounted on the two-port proportional valve mounting point 1107 to control the flow of the cooling liquid between that water pump 140 and the condenser 160.

It should be understood by those skilled in the art that, for the thermal management component with a large volume or weight, a plurality of component mounting points corresponding to each thermal management component may be provided to ensure stable mounting. Any quantity of the component mounting points is appropriate, as long as the quantity of the component mounting points can ensure stable mounting of the thermal management component. The present disclosure is not limited thereto.

The embodiments of the present disclosure are about the to-be-integrated thermal management components. A reasonable layout of component mounting points, corresponding to the to-be-integrated thermal management components, (which, in some embodiments, may include the expansion tank mounting point, the multi-port valve mounting point 1102, the water pump mounting point 1103, the heat exchanger mounting point 1104, the condenser mounting point 1105, the temperature sensor mounting point 1106, the two-port proportional valve mounting point 1107, and so on) on the multi-channel cooling pipeline integration apparatus 110 can realize the more compact arrangement of the integrated thermal management components, and optimize the layout of the cooling connection pipeline 111 in the multi-channel cooling pipeline integration apparatus 110, reducing manufacturing difficulty.

In some embodiments, as illustrated in FIG. 1, the multi-channel cooling pipeline integration apparatus 110 further has a plurality of cooling pipeline external ports formed thereon. Each of the plurality of cooling pipeline external ports is configured to be connected to a cooling liquid connection pipeline of a thermal management object of a vehicle. Positions of the plurality of external cooling pipeline external ports are arranged based on an arrangement position of the thermal management object to enable the cooling liquid connection pipeline of the thermal management object to be the shortest. The thermal management object here may include, but is not limited to, a DC-DC converter, a High Voltage Coolant Heater (HVCH), an On-Board Charger (OBC), a battery pack, a radiator, or the like.

Considering the multi-channel cooling pipeline integration apparatus 110 and thermal pipeline components to be integrated thereon as a whole, corresponding thermal management objects (such as the DC-DC converter, the HVCH, the OBC, the battery pack, the radiator, or the like described above) may be construed as counterparts of multi-channel cooling pipeline integration apparatus 110 and the integrated thermal management components. By fully considering arrangement positions of the counterparts, positions of the cooling pipeline external ports are set uniformly to enable a connection pipeline of the thermal management object to be the shortest, further reducing the costs and the weight of the whole vehicle.

In some embodiments, the cooling pipeline external ports include a radiator liquid-inlet port 1108, a radiator liquid-outlet port 1109, a DC-DC converter liquid-inlet port 1110, a high pressure liquid heater liquid-inlet port 1111, a high pressure liquid heater liquid-outlet port 1114, an on-vehicle charger liquid-outlet port 1112, a battery pack liquid-inlet port 1115, and a battery pack liquid-outlet port 1113. The radiator liquid-inlet port 1108, the radiator liquid-outlet port 1109, and the DC-DC converter liquid-inlet port 1110 are located at an end of the multi-channel cooling pipeline integration apparatus 110 in a length direction (in some embodiments, the end at which the water pump mounting point 1103 is located). The radiator liquid-inlet port 1108 and the radiator liquid-outlet port 1109 protrude towards a side of the multi-channel cooling pipeline integration apparatus 110 (in some embodiments, the side on which the water pump mounting point 1103 is located). The high pressure liquid heater liquid-inlet port 1111, the on-vehicle charger liquid-outlet port 1112, the battery pack liquid-outlet port 1113, the high pressure liquid heater liquid-outlet port 1114, and the battery pack liquid-inlet port 1115 are located at the other end of the multi-channel cooling pipeline integration apparatus 110 in the length direction (in some embodiments, the end at which the condenser mounting point 1105 is located), are arranged in a width direction of the multi-channel cooling pipeline integration apparatus 110 sequentially, and each have a protrusion direction identical to a protrusion direction of the radiator liquid-inlet port 1108. This arrangement can take into account the space utilization, aesthetics, and the convenience of usability of ports.

In some embodiments, further referring to FIG. 1, a plurality of mounting lugs 115 is further provided on the multi-channel cooling pipeline integration apparatus 110, and configured to have the multi-channel cooling pipeline integration apparatus 110 fixedly mounted on a body of the vehicle. Each of the plurality of mounting lugs 115 protrudes outwards from an edge of the multi-channel cooling pipeline integration apparatus 110. A through hole (which may be referred to as a third through hole 1151) is defined on each of the plurality of mounting lugs 115 and is configured to cooperate with a fastener, to mount the multi-channel cooling pipeline integration apparatus 110 to the body of the vehicle. In an embodiment, each mounting lug 115 includes a root connected to the edge of the multi-channel cooling pipeline integration apparatus 110 and a head facing away from the multi-channel cooling pipeline integration apparatus 110. The head has a central through hole, i.e., the third through hole 1151, defined thereon. To ensure stable mounting, at least three mounting lugs 115 are provided. In some embodiments, three mounting lugs 115 are provided. The three mounting lugs 115 may be disposed on three edges of a substantially rectangular contour of the multi-channel cooling pipeline integration apparatus 110, respectively. Further, a ring-shaped cushion may be disposed in the third through hole 1151 of each mounting lug 115. A thickness of the cushion is greater than a thickness of the head of the mounting lug 115, to enable a surface of the cushion to protrude beyond the third through hole 1151. Subsequent to mounting of the multi-channel cooling pipeline integration apparatus 110 to the body of the vehicle, the cushion can cushion a collision between the mounting lug 115 and the body of the vehicle to which the multi-channel cooling pipeline integration apparatus 110 is fixed. The cushion may be made of rubber.

Figure 3:
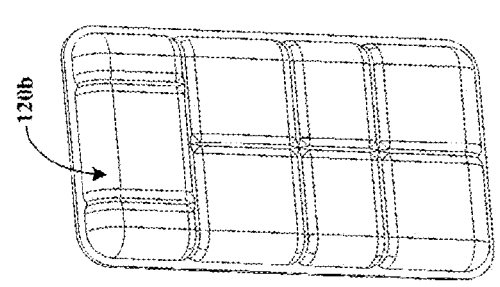
FIG. 3 illustrates a schematic exploded view of a multi-channel cooling pipeline integration apparatus according to an embodiment of the present disclosure.
Figure 3:
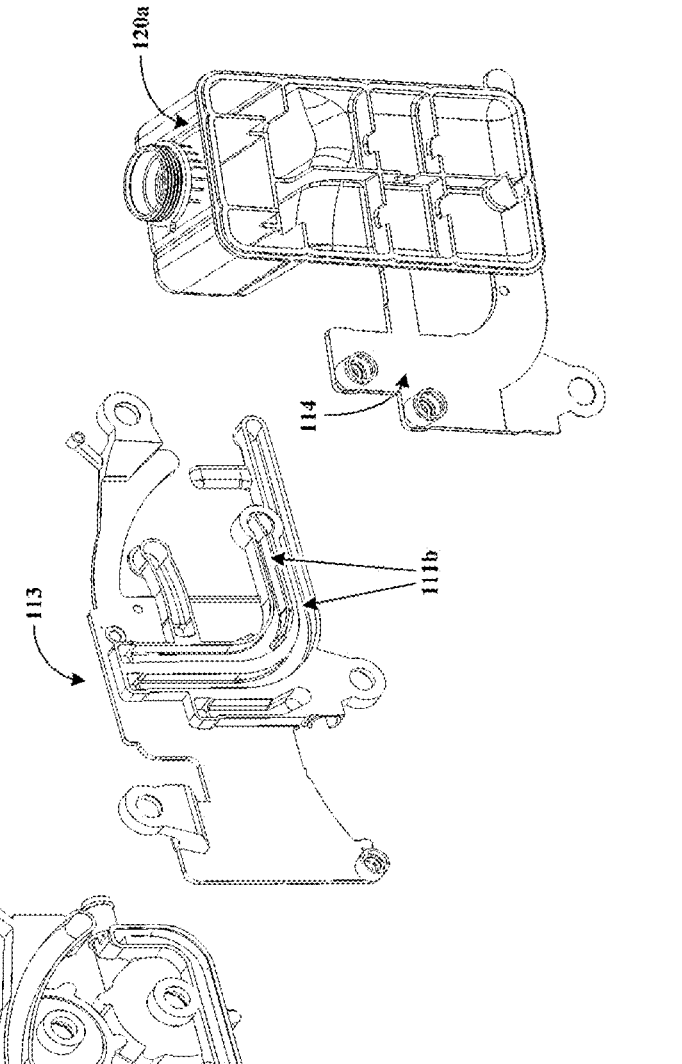

To facilitate molding of the multi-channel cooling pipeline integration apparatus 110, a separate molding method may be used. As illustrated in FIG. 3, the multi-channel cooling pipeline integration apparatus 110 may include a main body portion 112, a first cover plate portion 113, and a second cover plate portion 114. The main body portion 112, the first cover plate portion 113, and the second cover plate portion 114 are assembled together sequentially in a thickness direction of the multi-channel cooling pipeline integration apparatus 110. A first group of cooling connection pipelines 111*a* are provided on the main body portion 112 and have an opening towards the first cover plate portion 113. The first cover plate portion 113 at least partially covers the main body portion 112, and seals the first group of cooling connection pipelines 111*a*. A second group of cooling connection pipelines 111*b* are provided on the first cover plate portion 113 and have an opening towards the second cover plate portion 114. The second cover plate portion 114 at least partially covers the first cover plate portion 113, and seals the second group of cooling connection pipelines 111*b*. A double-layer multi-cooling connection pipeline structure may be formed within the multi-channel cooling pipeline integration apparatus 110 by adopting this structure, to realize the more compact structure of the multi-channel cooling pipeline integration apparatus 110, which reduces a planar area occupied by the multi-channel cooling pipeline integration apparatus 110, and provides more flexibility in the distribution of the cooling connection pipelines 111 within the multi-channel cooling pipeline integration apparatus 110.

To ensure thermal insulation between the cooling connection pipelines 111 and to minimize a heat loss, the multi-channel cooling pipeline integration apparatus 110 may be made of a thermal insulating plastic, such as Polypropylene (PP) or Polyamide 66 (PA66). By using PP or PA66, a strength of the multi-channel cooling pipeline integration apparatus 110 can be ensured along with the thermal insulation, to improve structural stability and durability of the multi-channel cooling pipeline integration apparatus 110.

In some embodiments, the main body portion 112, the first cover plate portion 113, and the second cover plate portion 114 each are formed by means of injection molding. Thereafter, the main body portion 112, the first cover plate portion 113, and the second cover plate portion 114 are connected and fixed by means of welding to obtain the multi-channel cooling pipeline integration apparatus 110. Welding methods include, but are not limited to, hot plate welding, friction welding, laser welding, etc.

In some embodiments, to ensure stable mounting of the expansion tank while simplifying mounting operations, an expansion tank body 120 may be pre-fixedly integrated on the multi-channel cooling pipeline integration apparatus 110. As illustrated in FIG. 3, the expansion tank body 120 is composed of a tank body 120*a* and a tank side cover 120*b*. The tank body 120*a* and the second cover plate portion 114 are integrally molded by means of injection molding. The tank side cover 120*b* is individually made by means of injection molding. Thereafter, the tank body 120*a* and the tank side cover 120*b* are connected and fixed by means of welding to form a whole expansion tank body 120. Herein, welding methods include, but are not limited to, hot plate welding, friction welding, laser welding, or the like. A pressure cover mounting point is disposed at a top of the expansion tank body 120. A complete expansion tank is obtained subsequent to mounting of a pressure cover 121.

Figure 4:
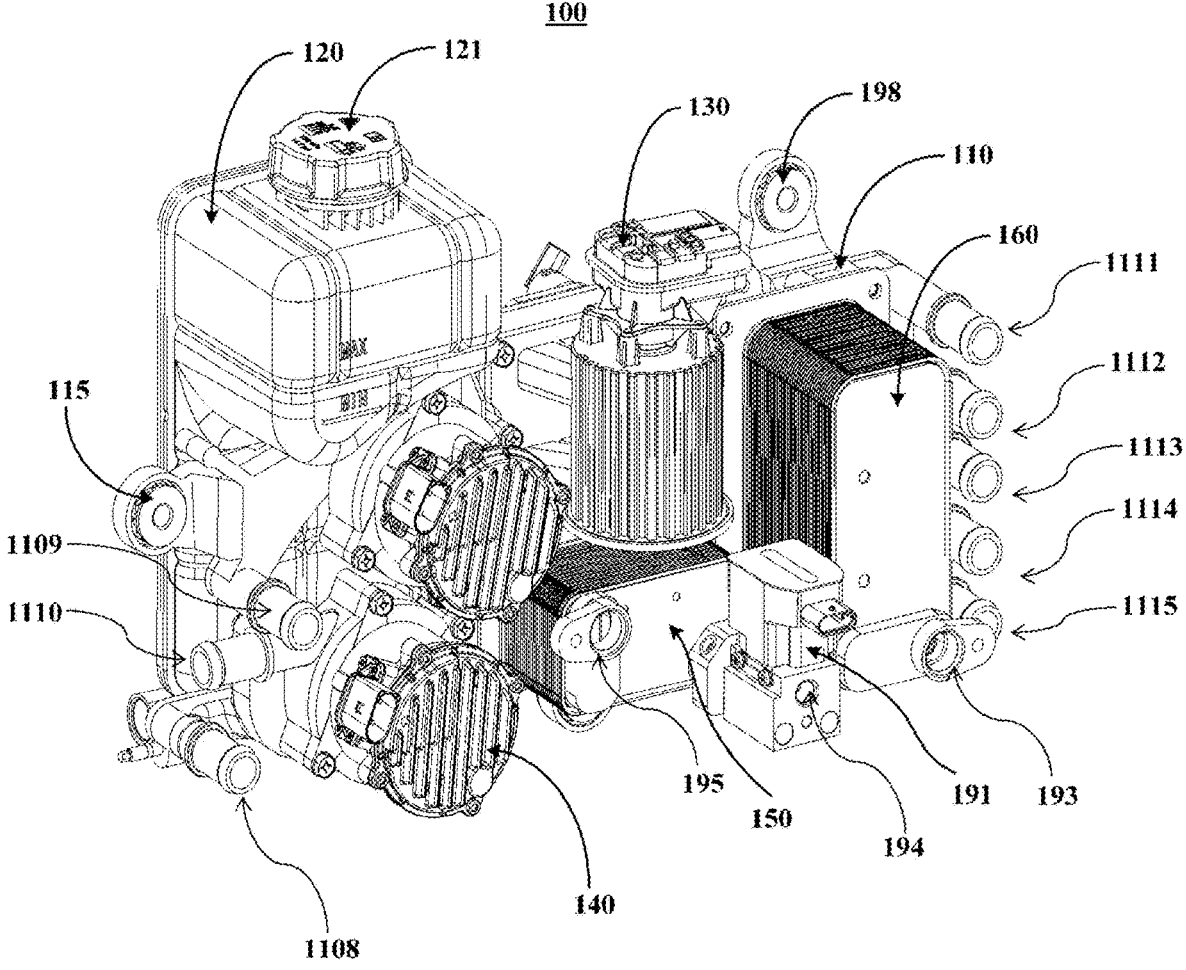
FIG. 4 illustrates a schematic structural view of a thermal management integration module according to an embodiment of the present disclosure, as viewed from a side thereof.
Figure 5:
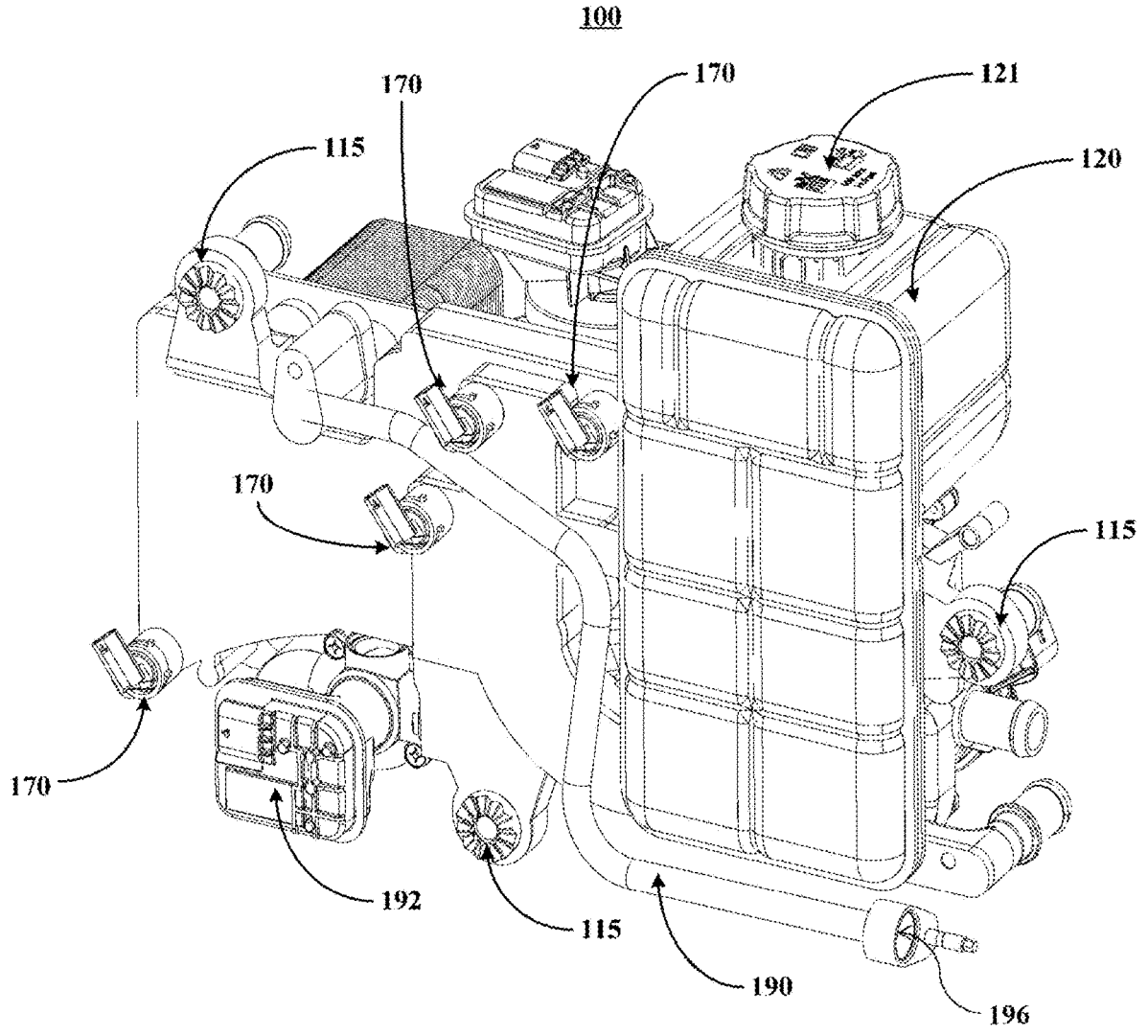
FIG. 5 illustrates a schematic structural view of the thermal management integration module illustrated in FIG. 4, as viewed from another side thereof.

Based on the same technical concept, the embodiments of the present disclosure further provide a thermal management integration module. FIG. 4 illustrates a schematic structural view of a thermal management integration module 100 according to an embodiment of the present disclosure, as viewed from a side thereof. FIG. 5 illustrates a schematic structural view of the thermal management integration module 100 illustrated in FIG. 4, as viewed from another side thereof. As illustrated in FIG. 4 and FIG. 5, the thermal management integration module 100 may generally include the multi-channel cooling pipeline integration apparatus 110 according to any one of the aforementioned embodiments and a combination thereof and at least two thermal management components. The multi-channel cooling pipeline integration apparatus 110 has the plurality of cooling connection pipelines 111 (e.g., water lines) formed therein, and provides the plurality of component mounting points and the plurality of component connection ports 116, in such a manner that the multi-channel cooling pipeline integration apparatus 110 can not only serve as the connection channel between different thermal management components, but also serve as the carrier member for the entire thermal management integration module 100 to carry the thermal management components. The at least two thermal management components are mounted on the multi-channel cooling pipeline integration apparatus 110 and connected to each other through the cooling connection pipelines 111 in the multi-channel cooling pipeline integration apparatus 110.

Based on the component mounting points provided on the multi-channel cooling pipeline integration apparatus 110, the thermal management components mounted on the multi-channel cooling pipeline integration apparatus 110 may accordingly be at least two of the expansion tank, the multi-port valve 130, the water pump 140, the heat exchanger 150, the condenser 160, the temperature sensor 170, or the two-port proportional valve 192.

In some embodiments, the thermal management components, integrated on the multi-channel cooling pipeline integration apparatus 110, in the thermal management integration module 100 may further include components in a cooling liquid circulation loop for an air conditioner in the vehicle, such as a dryer, an electronic expansion valve 191, and an air conditioning pipeline 190.

In an embodiment, the thermal management integration module 100 includes the dryer, two electronic expansion valves 191, and the air conditioning pipeline 190. The dryer and the electronic expansion valves 191 are correspondingly mounted at positions on the side of the multi-channel cooling pipeline integration apparatus 110 opposite to the heat exchanger 150. The air conditioning pipeline 190, as a refrigerant flowing pipeline, is connected to the dryer, the electronic expansion valve 191, the heat exchanger 150, and the condenser 160, to realize circulation of a refrigerant in a compressor of the air conditioner. A main body portion of the air conditioning pipeline 190 extends on the side of the multi-channel cooling pipeline integration apparatus 110 on which the dryer is located.

Further, the air conditioning pipeline 190 further has an air conditioning pipeline external port configured to be connected to a refrigerant connection pipeline of the thermal management object associated with the air conditioner of the vehicle. In some embodiments, the thermal management object associated with the air conditioner of the vehicle includes a built-in condenser and a compressor of an air conditioning main unit, and the air conditioning pipeline external port includes a built-in condenser inlet port 193, a built-in condenser outlet port 194, a compressor inlet port 195, and a compressor outlet port 196. Each of the built-in condenser inlet port 193 and the built-in condenser outlet port 194 is configured to be connected to a refrigerant connection pipeline of the built-in condenser of the air conditioning main unit of the vehicle. Each of the compressor inlet port 195 and the compressor outlet port 196 is configured to be connected to a refrigerant connection pipeline of a compressor of the vehicle. Positions of the built-in condenser inlet port 193, the built-in condenser outlet port 194, the compressor inlet port 195, and the compressor outlet port 196 are distributed based on arrangement positions of the built-in condenser and the compressor to enable the refrigerant connection pipeline of the built-in condenser and the refrigerant connection pipeline of the compressor to be the shortest. The air conditioning pipeline external port may further include a built-in evaporator inlet port configured to be connected to the refrigerant connection pipeline of the built-in evaporator in the air conditioning main unit. A position of the built-in evaporator inlet port is distributed based on an arrangement position of the built-in evaporator to enable the refrigerant connection pipeline of the built-in evaporator to be the shortest.

In another embodiment, the thermal management integration module 100 includes one electronic expansion valve 191 and the air conditioning pipeline 190 and include no dryer. In this case, as illustrated in FIG. 4 and FIG. 5, the electronic expansion valve 191 is mounted on the same side of the multi-channel cooling pipeline integration apparatus 110 as the heat exchanger 150 and at a position close to the heat exchanger 150, and the air conditioning pipeline 190 is connected to the electronic expansion valve 191, the heat exchanger 150, and the condenser 160. The main body portion of the air conditioning pipeline 190 extends on the side of the multi-channel cooling pipeline integration apparatus 110 on which the expansion tank is located, and forms the compressor outlet port 196 on the same side as the expansion tank and below the expansion tank. The built-in condenser outlet port 194 is formed on a valve seat of the electronic expansion valve 191. The built-in condenser inlet port 193 and the compressor inlet port 195 are formed on the condenser 160 and the heat exchanger 150, respectively. Thus, a length of the air conditioning pipeline 190 and lengths of the connection pipelines between the compressor and the built-in condenser and these corresponding ports can be effectively shortened.

Figure 6:
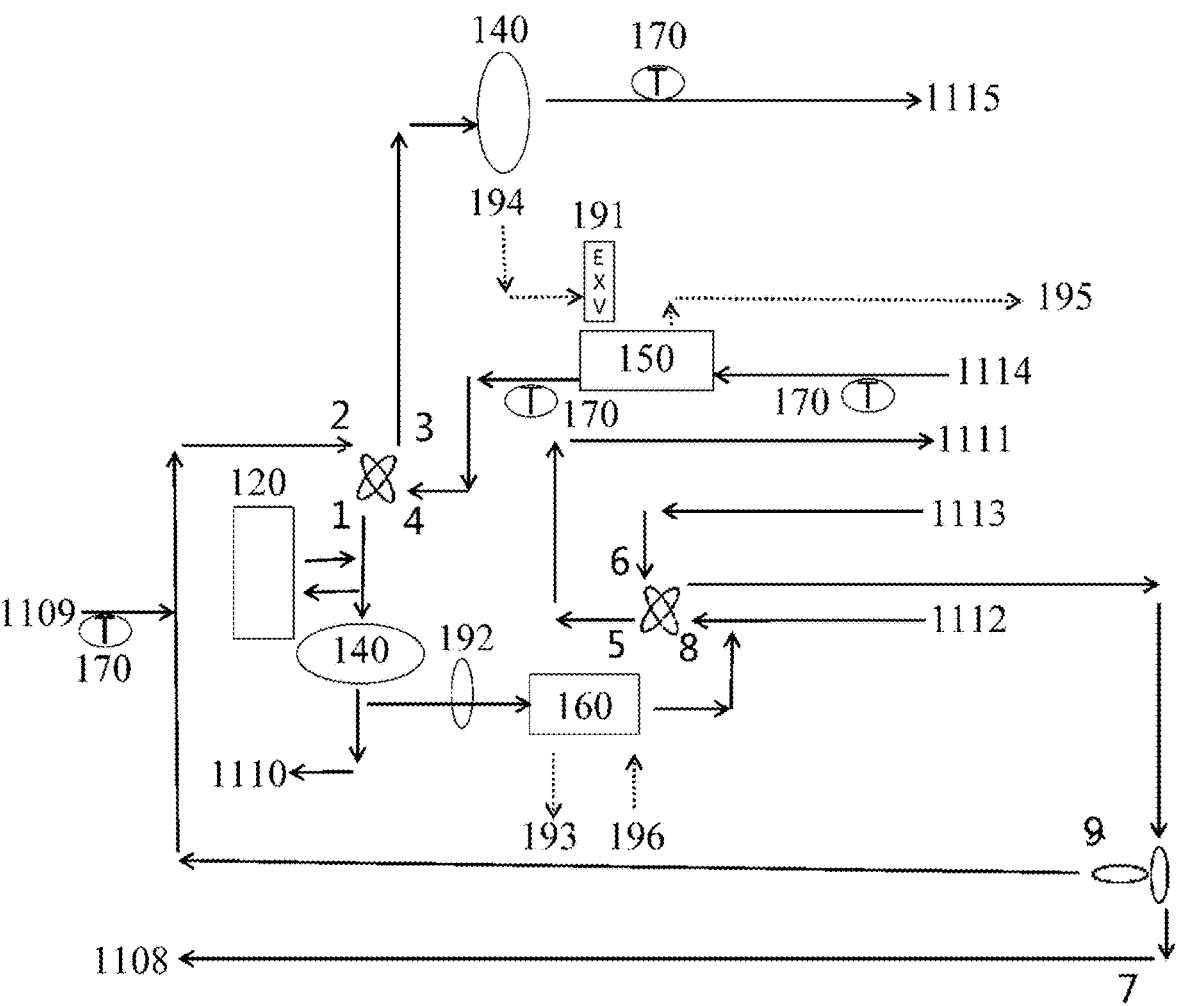
FIG. 6 illustrates a schematic diagram of a principle of a thermal management integration module according to an embodiment of the present disclosure.

The components of the thermal management integration module 100 according to the embodiment are described in detail above, while the implementation principle of the thermal management integration module 100 according to the embodiment will be explained below in conjunction with FIG. 6. FIG. 6 illustrates a schematic diagram of a principle of the thermal management integration module 100 according to an embodiment of the present disclosure. As illustrated in FIG. 6, two electronic water pumps 140 (which are referred to as the battery water pump and the motor water pump, respectively), the one-piece nine-port valve, the water-cooled condenser 160, the heat exchanger 150, the expansion tank, four temperature sensors 170 (water temperature sensors), the intelligent two-port proportional valve 192, one electronic expansion valve 191, and the air conditioning pipeline 190 are integrated on the multi-channel cooling pipeline integration apparatus 110. In FIG. 6, the one-piece nine-port valve is equivalent to two four-port solenoid valves and one three-port solenoid valve, with number 1 to number 9 indicating nine ports of the one-piece nine-port valve. The solid line indicates the cooling connection pipeline 111 in the multi-channel cooling pipeline integration apparatus 110. The arrow on the solid line indicates a flow direction of the cooling liquid in the cooling connection pipeline 111. The dotted line indicates the air conditioning pipeline 190. The arrow on the dotted line indicates a flow direction of the refrigerant in the air conditioning pipeline 190. Through the cooling connection pipeline 111 and the air conditioning pipeline 190 in the multi-channel cooling pipeline integration apparatus 110, connections between respective thermal management components illustrated in FIG. 6 are achieved. In addition, the plurality of cooling pipeline external ports and the air conditioning pipeline external ports illustrated in FIG. 6 (which, in some embodiments, are the radiator liquid-inlet port 1108, the radiator liquid-outlet port 1109, the DC-DC converter liquid-inlet port 1110, the high pressure liquid heater liquid-inlet port 1111, the high pressure liquid heater liquid-outlet port 1114, the on-vehicle charger liquid-outlet port 1112, the battery pack liquid-inlet port 1115, the battery pack liquid-outlet port 1113, the built-in condenser inlet port 193, the built-in condenser outlet port 194, the compressor inlet port 195, and the compressor outlet port 196) are provided to form different thermal management loops.

The thermal management integration module 100 according to the embodiments of the present disclosure uses a design of the multi-channel cooling pipeline integration apparatus 110 to form the thermal management integration module 100 with low costs, a light weight, and a small arrangement space. Compared with a conventional vehicle thermal management system, the thermal management integration module 100 of the present disclosure can allow the costs of each electric vehicle adopting the thermal management integration module 100 to be reduced by more than 300 RMB and the weight of each electric vehicle to be reduced by more than 2 kg. In addition, the thermal management integration module 100 of the present disclosure can be supplied in a modular form, which greatly optimizes supplier management and working hours of manufacturing workers.

Based on the same technical concept, the embodiments of the present disclosure further provide an electric vehicle including the thermal management integration module 100 according to any or a combination of the above-mentioned embodiments.

Compared with a conventional vehicle thermal management system, the thermal management integration module 100 of the present disclosure can allow the costs of each electric vehicle adopting the thermal management integration module 100 to be reduced by more than 300 RMB and the weight of each electric vehicle to be reduced by more than 2 kg.

At this point, it is conceivable for those skilled in the art that, although exemplary embodiments of the present disclosure have been shown and described in detail herein, many other variations or modifications consistent with the principle of the present disclosure can still be directly determined or deduced from the contents of the present disclosure, without departing from the spirit and scope of the present disclosure. Accordingly, the scope of the present disclosure should be construed and determined to cover all such other variations or modifications.

What is claimed is:

1. A multi-channel cooling pipeline integration apparatus, being in a substantially rectangular plate shape, and having a plurality of cooling connection pipelines formed therein, a plurality of component mounting points and a plurality of component connection ports being disposed on a surface of the multi-channel cooling pipeline integration apparatus, wherein:

the plurality of component mounting points is configured to have at least two thermal management components mounted thereon; and each of the plurality of component connection ports is in communication with a corresponding one of the plurality of cooling connection pipelines, to enable the at least two thermal management components mounted on the plurality of component mounting points to be connected, through the plurality of component connection ports, to the plurality of cooling connection pipelines, and the at least two thermal management components are configured to be connected to each other through the plurality of cooling connection pipelines, wherein multi-channel cooling pipeline integration apparatus comprises a main body portion, a first cover plate portion, and a second cover plate portion, wherein:

the main body portion, the first cover plate portion, and the second cover plate portion are assembled together sequentially in a thickness direction of the multi-channel cooling pipeline integration apparatus;

a first group of cooling connection pipelines are provided on the main body portion and have an opening towards the first cover plate portion;

the first cover plate portion seals the first group of cooling connection pipelines, and a second group of cooling connection pipelines are provided on the first cover plate portion and have an opening towards the second cover plate portion; and the second cover plate portion seals the second group of cooling connection pipelines.

2. The multi-channel cooling pipeline integration apparatus according to claim 1, wherein the plurality of component mounting points comprises at least two of an expansion tank mounting point, a multi-port valve mounting point, a water pump mounting point, a heat exchanger mounting point, a condenser mounting point, a temperature sensor mounting point, or a two-port proportional valve mounting point.

3. The multi-channel cooling pipeline integration apparatus according to claim 2, wherein:

when the plurality of component mounting points comprises a plurality of water pump mounting points, the plurality of water pump mounting points is disposed on a side of an end of the multi-channel cooling pipeline integration apparatus in a length direction, and a position distribution of the plurality of water pump mounting points enables at least two water pumps to be mounted, via the plurality of water pump mounting points, on the same side of the end of the multi-channel cooling pipeline integration apparatus in the length direction and to be arranged in a width direction of the multi-channel cooling pipeline integration apparatus; and when the plurality of component mounting points further comprises the expansion tank mounting point, the expansion tank mounting point is disposed on the other side of the end of the multi-channel cooling pipeline integration apparatus at which the water pump mounting point is located, to enable an expansion tank to be mounted at a position on a side of the multi-channel cooling pipeline integration apparatus opposite to the water pump.

4. The multi-channel cooling pipeline integration apparatus according to claim 2, wherein when the plurality of component mounting points further comprises the multi-port valve mounting point, the multi-port valve mounting point is disposed on a middle portion of a side of the multi-channel cooling pipeline integration apparatus, to enable a multi-port valve to be mounted on the middle portion of the side of the multi-channel cooling pipeline integration apparatus.

5. The multi-channel cooling pipeline integration apparatus according to claim 4, wherein when the plurality of component mounting points further comprises the heat exchanger mounting point, the heat exchanger mounting point is disposed on the same side of the multi-channel cooling pipeline integration apparatus as the multi-port valve mounting point, and a position distribution of the heat exchanger mounting point enables a heat exchanger to be mounted at a position on the same side of the multi-channel cooling pipeline integration apparatus as the multi-port valve and close to the multi-port valve.

6. The multi-channel cooling pipeline integration apparatus according to claim 5, wherein when the plurality of component mounting points further comprises the condenser mounting point, the condenser mounting point is disposed at an end of the multi-channel cooling pipeline integration apparatus in a length direction, on the same side as the heat exchanger mounting point, and a position distribution of the condenser mounting point enables a condenser to be mounted at a position on the same side of the multi-channel cooling pipeline integration apparatus as the heat exchanger and adjacent to the heat exchanger.

7. The multi-channel cooling pipeline integration apparatus according to claim 1, wherein the multi-channel cooling pipeline integration apparatus has a plurality of cooling pipeline external ports, each of the plurality of cooling pipeline external ports is configured to be connected to a cooling liquid connection pipeline of a thermal management object of a vehicle, and positions of the plurality of cooling pipeline external ports are arranged based on an arrangement position of the thermal management object to enable the cooling liquid connection pipeline of the thermal management object to be the shortest.

8. The multi-channel cooling pipeline integration apparatus according to claim 7, wherein:

the plurality of cooling pipeline external ports comprises a radiator liquid-inlet port, a radiator liquid-outlet port, a Direct Current-Direct Current (DC-DC) converter liquid-inlet port, a high pressure liquid heater liquid-inlet port, a high pressure liquid heater liquid-outlet port, an on-vehicle charger liquid-outlet port, a battery pack liquid-inlet port, and a battery pack liquid-outlet port;

the radiator liquid-inlet port, the radiator liquid-outlet port, and the DC-DC converter liquid-inlet port are located at an end of the multi-channel cooling pipeline integration apparatus in a length direction, and the radiator liquid-inlet port and the radiator liquid-outlet port protrude towards a side of the multi-channel cooling pipeline integration apparatus; and the high pressure liquid heater liquid-inlet port, the on-vehicle charger liquid-outlet port, the battery pack liquid-outlet port, the high pressure liquid heater liquid-outlet port, and the battery pack liquid-inlet port are located at the other end of the multi-channel cooling pipeline integration apparatus in the length direction, are arranged in a width direction of the multi-channel cooling pipeline integration apparatus sequentially, and each have a protrusion direction identical to a protrusion direction of the radiator liquid-inlet port.

9. The multi-channel cooling pipeline integration apparatus according to claim 1, wherein a plurality of mounting lugs is further provided on the multi-channel cooling pipeline integration apparatus, each of the plurality of mounting lugs protrudes outwards from an edge of the multi-channel cooling pipeline integration apparatus, and a through hole is defined on each of the plurality of mounting lugs and is configured to cooperate with a fastener, to mount the multi-channel cooling pipeline integration apparatus to a body of a vehicle.

10. The multi-channel cooling pipeline integration apparatus according to claim 9, wherein three mounting lugs are provided, and are disposed on three edges of a substantially rectangular contour of the multi-channel cooling pipeline integration apparatus, respectively.

11. The multi-channel cooling pipeline integration apparatus according to claim 1, wherein the multi-channel cooling pipeline integration apparatus is made of a thermal insulating plastic.

12. The multi-channel cooling pipeline integration apparatus according to claim 11, wherein the thermal insulating plastic comprises polypropylene or polyamide 66.

13. The multi-channel cooling pipeline integration apparatus according to claim 11, wherein the main body portion, the first cover plate portion, and the second cover plate portion each are formed by means of injection molding.

14. The multi-channel cooling pipeline integration apparatus according to claim 11, wherein the main body portion, the first cover plate portion, and the second cover plate portion are assembled by means of hot plate welding, friction welding, or laser welding.

15. The multi-channel cooling pipeline integration apparatus according to claim 13, wherein an expansion tank body is fixedly integrated on the multi-channel cooling pipeline integration apparatus, the expansion tank body is composed of a tank body and a tank side cover, the tank body and the second cover plate portion are integrally formed, the tank side cover is formed by means of injection molding, and the tank body and the tank side cover are assembled by means of hot plate welding, friction welding, or laser welding.

16. A thermal management integration module, comprising:
the multi-channel cooling pipeline integration apparatus according to claim 1; and
at least two thermal management components mounted on the multi-channel cooling pipeline integration apparatus and connected to each other through the cooling connection pipeline.

17. The thermal management integration module according to claim 16, wherein the at least two thermal management components comprise at least two of an expansion tank, a multi-port valve, a water pump, a heat exchanger, a condenser, a temperature sensor, a dryer, an electronic expansion valve, a two-port proportional valve, or an air conditioning pipeline.

18. An electric vehicle, comprising the thermal management integration module according to claim 16.

19. The electric vehicle according to claim 18, wherein the at least two thermal management components comprise at least two of an expansion tank, a multi-port valve, a water pump, a heat exchanger, a condenser, a temperature sensor, a dryer, an electronic expansion valve, a two-port proportional valve, or an air conditioning pipeline.

* * * * *